Jan. 30, 1968 A. P. MULLERY ET AL 3,366,929

COMPUTING SYSTEM EMBODYING FLEXIBLE SUBROUTINE CAPABILITIES

Filed Dec. 30, 1964 5 Sheets-Sheet 1

INVENTORS
ALVIN P. MULLERY
ROBERT H. RIEKERT
RALPH F. SCHAUER

BY [signature]
ATTORNEY

United States Patent Office 3,366,929
Patented Jan. 30, 1968

3,366,929
COMPUTING SYSTEM EMBODYING FLEXIBLE SUBROUTINE CAPABILITIES

Alvin P. Mullery, Chappaqua, Robert H. Riekert, Hawthorne, and Ralph F. Schauer, Putnam Valley, N.Y., assignors to International Business Machines Corporation, New York, N.Y., a corporation of New York Filed Dec. 30, 1964, Ser. No. 422,343
12 Claims. (Cl. 340—172.5)

ABSTRACT OF THE DISCLOSURE

A system providing for the specification of subroutines within subroutines utilized in the programming language. The system utilizes a table look-up scheme and push down stores to specify various subroutine address entry points and return points wherein the given subroutine may contain a plurality of levels of subroutines therewithin. Included are an instruction control unit which includes an instruction unit, arithmetic unit, memory, and memory accessing controls; and an instruction program evaluating unit including subroutine accessing and evaluation controls. Included in the program evaluating unit are parameter accessing controls whereby parameters called for in a subroutine may be appropriately accessed from memory and specific parameters referred to in a generalized format within the actual subroutine instruction list rather than being specified by particular addresses.

The present invention relates to a computing system allowing great latitude in the subroutining capabilities of the programming language. More particularly, it relates to such a system wherein subroutines and parameters therefor are kept track of by utilizing a table look-up scheme and push down stores.

The present invention is related to and particularly adapted for use with copending U.S. patent application Ser. No. 292,606, entitled, "Computer Instruction, Sequencing and Control System," of A. P. Mullery and R. F. Schauer, filed July 3, 1963, now Patent No. 3,293,616. The disclosed system constitutes an improvement or additional performance capability over the general system disclosed in this copending application. However, it is to be understood that the concepts herein may be used independently with other existing systems as well.

In the majority of present-day electronic computers when an arithmetic or other operation is to be performed, the machine must be given specifically organized machine instructions so that it may automatically perform the computations sequentially from such instructions. In the majority of cases, providing such a detailed, sequential instruction for a computer is neither natural nor convenient but involves extremely complicated sets of machine instructions or programs.

The method usually used in present-day computers to effect something approaching reasonable machine languages for use by the machine operator or programmer involves special machine languages such as Fortran, Cobol, and Lisp to name just a few. Using machine languages, such as Fortran, the programmer is able to use instructions which somewhat resemble a standard algebraic expression. However, there are a large number of special rules which must be remembered with such a language which complicate its use and which practically limit the number of problems and the number and type of parenthetical expression which may be conveniently solved in any one machine operation. Further, when using Fortran language, compilation and assembly of the actual machine language instruction must be performed, both of which require considerable quantities of machine time as well as requiring large sections of memory for storage of the Fortran program and also various compiler and assembly programs. It may thus be seen that even using such specialized machine language, many limitations are placed upon the programmer in terms of the types of operations which can be performed and a great deal of machine time as well as special hardware is required to perform such special language programs.

The above referenced copending application somewhat simplifies a programmer's problems in that a mathematical instruction may be stated and given to a computer in a more or less natural algebraic form without following the very detailed and complicated rules required of the above mentioned program languages.

However, another major problem in the programming of computers is where particularly complicated mathematical procedures, such as matrix multiplication, square rooting, raising to powers and certain iterative equations, must be performed by the machine. Since, in any given expression when one of these particular procedures is called for, the actual mechanics of the operation are the same, special subprograms or subroutines are written for these procedures and stored permanently in the machine for access when called for. The particular parameters or numbers involved in the operation, of course, are specified in the operation request or call when these operations are required. Such operations are known in the computer arts as subroutines and lend considerable power to many of the computer languages. However, most present day computers are quite limited in the number of subroutines that can be executed at a given point within a particular loop. In most systems the number would be limited to one. Further, it is usually not possible to use a subroutine within a subroutine, that is, where one parameter or number of a particular subroutine is actually the result of another subroutine or where the results of one subroutine are used during the execution of another. In this case, the innermost subroutine must be written out in detail. It is further not possible with present systems to conveniently refer to various parameters within a set of hierarchical subroutines as each parameter must be specifically spelled out and referred to. It would simplify the problem of programming a computer if these parameters could be accessed symbolically or in ascending numerical order beginning with the first parameter within a particular machine program because any parameter can then be specified without in any way affecting the subroutine program itself.

There is obviously a need both in standard computing systems requiring complete machine programming languages, such as Fortran, and also in the type of automatic instruction sequencing computer organization disclosed in copending patent application Ser. No. 292,606 referred to previously for greater subroutine and loop flexibility.

It has now been found that special purpose hardware may be provided which is capable of greatly increasing the flexibility of present day computers for handling complicated subroutine statements. By use of this system multiple subroutine levels may be used in a given statement, i.e., subroutines within subroutines. Further, various parameters used recurrently in different portions of a subroutine may conveniently be referred to by merely using a characteristic parameter indicator and an indication of the parameter being referred to in a given instance, i.e., the first, second, third, fourth, etc.

It is accordingly a primary object of the present invention to provide a computing system capable of automatically performing subroutines.

It is a further object to provide such a computing system capable of automatically performing subroutines within subroutines.

It is yet another object of the invention to automatically perform hierarchical subroutine structures wherein parameters are named symbolically and may be specified a plurality of times utilizing such symbolic representation.

It is a further object of the invention to provide such a computer system whereby a subroutine may be used in its own definition.

It is still another object of the invention to provide such a system constructed of conventional computer building blocks.

The foregoing and other objects, features and advantages of the invention will be apparent from the following more particular description of preferred embodiments of the invention, as illustrated in the accompanying drawings.

Figure 3A:
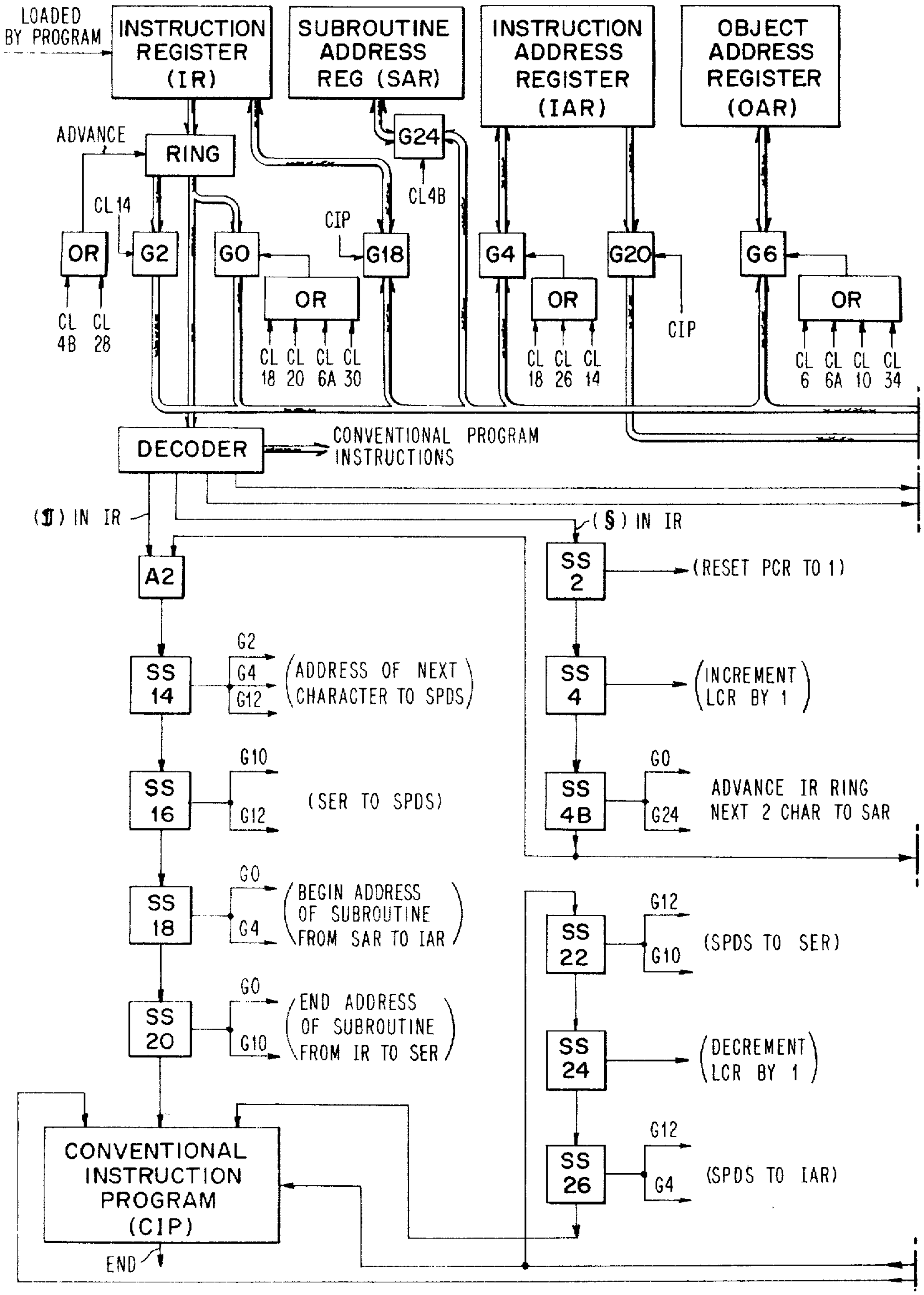
Figure 3B:
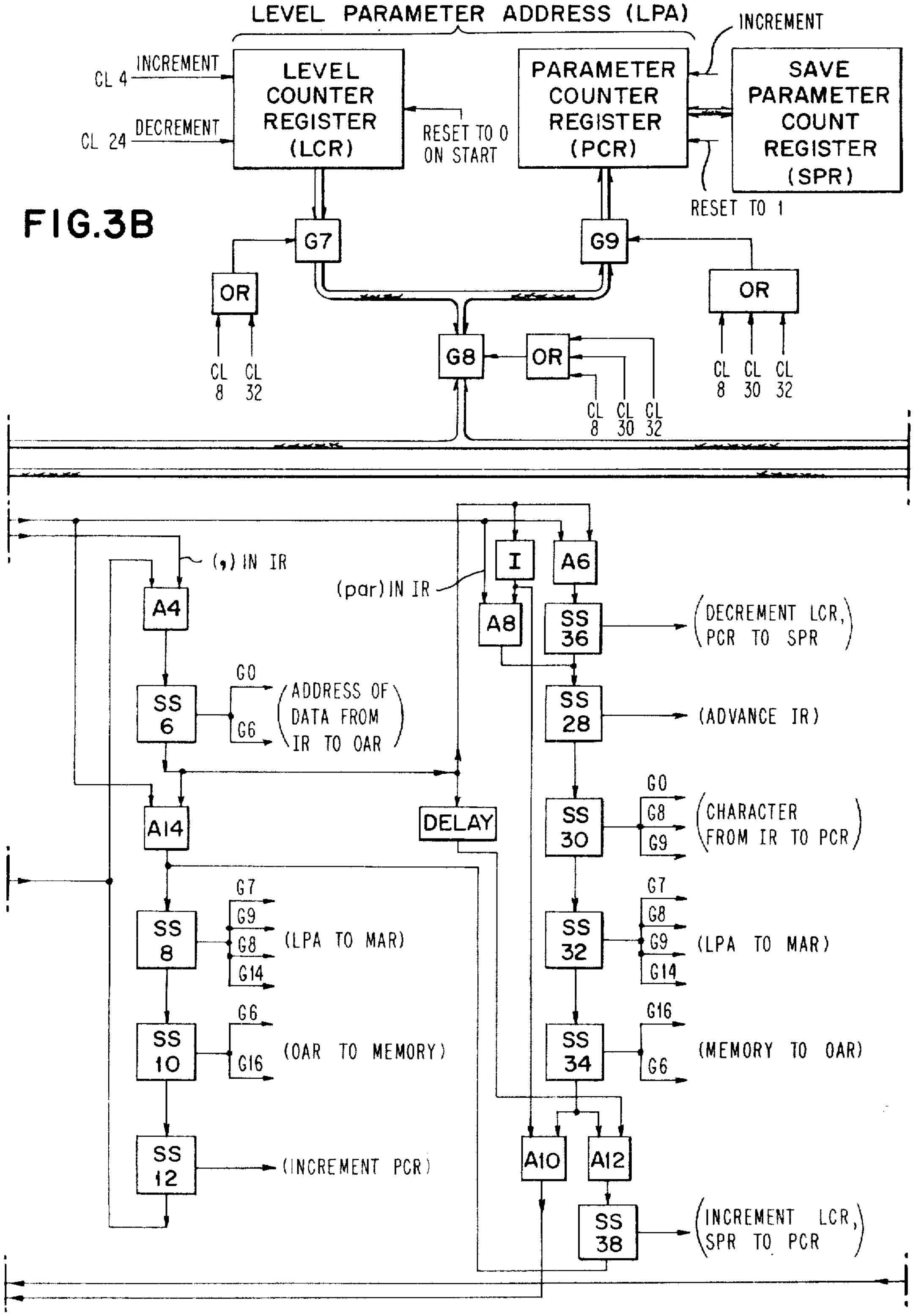
Figures 3, 3C:
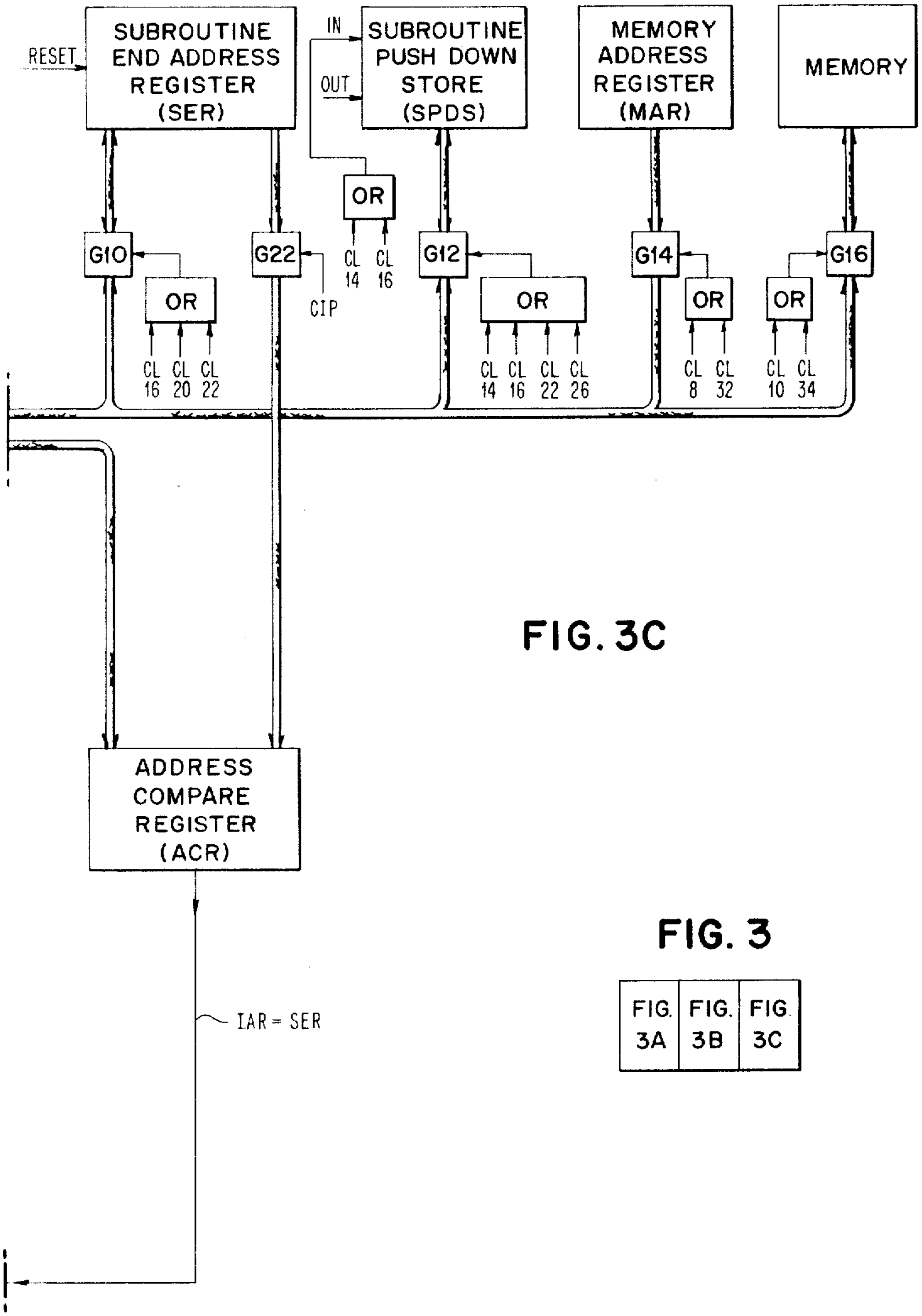

FIGURE 3 comprises an organizational diagram of FIGURES 3*a*–3*c*.

FIGURES 3*a*–3*c* comprise a detailed logical schematic diagram of the principal components of the present system necessary to practice the invention, which system could be incorporated in any general purpose computer.

The objects of the present invention are accomplished in general by a system for handling subroutines in a general purpose computer, said general purpose computer including an instruction and control unit, arithmetic units, a memory, and memory addressing unit. The instant system comprises a means for detecting the occurrence of a subroutine in the computer instruction, means for evaluating and storing all of the parameters provided in the instruction for use in the particular program, means for performing the subroutine as soon as the subroutine call has been completely evaluated, means for recalling the parameters from said evaluation means during performance of the subroutine and means for returning to the original position in the program instruction upon completion of said subroutine.

A further feature of the present invention includes automatic controls necessary for performing subroutines within subroutines as each said subroutine is encountered. The system controls require that each subroutine end must be known or specially marked. Thus, the end of a subroutine is recognized when the known end address is reached or when the special mark is reached. In such system instructions wherein there are hierarchies of subroutines or subroutines within subroutines, the innermost subroutine will, of course, be completely executed first before outer ones are completely executed. The execution of each subroutine, however, is commenced immediately upon being called. As will be noted in the subsequent discussion and examples, there is no limitation other than the amount of storage hardware and counters to be provided on the size of a particular subroutine instruction hierarchy. Also, a subroutine may be used in a loop instruction in a large subroutine and repeated until a particular condition is satisfied. Such an instruction or loop being commonly referred to as the iterative loop wherein a certain operation is performed and the result obtained and compared with the desired quantity and if the particular requirement for the instruction is not satisfied, the original starting parameters modified and the instruction repeated until the desired condition or degree of accuracy for the particular problem is, in fact, satisfied or found to be impossible with satisfaction.

According to yet another aspect of the invention, means are provided so that a particular parameter need be named specifically only once in a particular subroutine hierarchy. After such specific naming or addressing of same in memory, the parameter need be referred to only symbolically in the subsequent loops and the parameter will automatically be extracted and used in calculations in the inner subroutines.

The system herein described presents a method by which subroutines may be defined and used in a completely general way. The system utilizes a push down store in a particular manner to store the addresses for return and end points at each level of the subroutine. This allows the removal of any restriction on the number of levels of subroutines which may be controlled by the system in a given instruction. A further vital part of the system includes a specially addressed storage section of memory and an address generating means therefor. By this means an address depending upon the level of the subroutine and the particular sequential number of a parameter is generated at which addressed location parameters for any and all levels of a particular subroutine instruction may be stored. The extent of the generality of usefulness of the present system is demonstrated by the fact that a subroutine may be defined recursively or stated differently, a particular subroutine may be used in its own definition.

Before proceeding further with the description of a particularly disclosed embodiment of the invention, it should be noted that it is assumed that the operation of a general purpose stored program computer is well known in the art. A very general description of such a computer is included with the description of FIGURE 1, however, great numbers of literature references are available wherein such systems are described. For example, the I.B.M. 7090 Customer Engineers Manual describes such a computer system wherein instructions are fed to the instruction unit which interprets same and controls memory fetch and store operations, process unit operations, and finally, result storage in memory upon the completion of given operations. Another well known text describing the operation of modern day computers is the book, Arithmetic Operations in Digital Computers, by R. K. Richards, D. Van Nostrand Company, Inc., 1955. In such general purpose computers as described in the above references, it is common practice to merely name a particular subroutine by means of specifying the beginning address of same in the main machine memory where the specific steps of such subroutine are stored. Thus, by providing the specific beginning address which is the method assumed in the presently disclosed embodiment or by some sort of a symbolic or indirect addressing scheme, the particular subroutine may be accessed. As stated previously, the presently disclosed embodiment of the invention is particularly adapted for use with the system set forth in U.S. patent application Ser. No. 292.606. The Instruction Register Ring, Object Address Register, etc., of the present system are substantially the same as those disclosed in the above mentioned embodiment, the exception being that for the present invention only those outputs of the Decoder which are specifically shown are the ones with which the present system is concerned. As with the above identified application, the Decoder works on the well known principle of decoding instructions stated in binary bit combinations wherein particular sequences of binary bits result in an output on a certain line from the Decoder. Thus, with the present system, as will be disclosed subsequently, special symbols indicating the occurrence of a subroutine, the occurrence of a parameter, and the end of a subroutine and a subsequent call for a parameter would have particular code combinations which would be detectable by the Decoder of the present system and result in outputs therefrom which will key the various control sections of the present systems. It is to be further understood that with this particular embodiment it is assumed that subroutines are stored in memory in the conventional manner and are available upon call by the system when provided with the subroutine beginning address. It is further to be understood that with each subroutine stored in memory that the first information stored in the subroutine is the end address thereof. This end address is used to detect when the end of a particular subroutine is reached. This particular method of detecting the end of a subroutine is meant to be exemplary only in that with the present system by comparing the current address in the Instruction Address Register with the stated end address for the subroutine, the end of said subroutine may be detected. However, in many systems a special symbol is utilized to indicate the end of a subroutine and it is to be understood that the present system would operate satisfactorily with such an end indication, said indication being operative to return the system to the original return address stored in the push down store as will be described subsequently.

In addition to the especially addressed storage for storing subroutine parameters and the Subroutine Push Down Store, a number of other Holding Registers and Indexing Registers are utilized together with conventional gate circuits, OR circuits, AND circuits and a System Control Clock which comprises a series of well known single shot multivibrators connected in the indicated logical configuration such that the turn on pulse of said multivibrator provdes a certain function or produces a particular machine operation and the turn off of said single shot or clock stage causes the system to proceed to a subsequent control point which will be determined either by a direct connection to a subsequent clock stage or by connection into a logic circuit to determine the requisite branch conditions. All of the individual blocks shown in the logical schematic diagram of FIGURE 3 are conventional and may be found in a wide number of readily available sources, such for example, the the book by R. K. Richards, entitled Digital Computer, Components and Circuits, D. Van Nostrand Company, Inc., 1957. However, the specific description of the logical schematic will be presented subsequently in the specification relative to the general description of FIGURE 3 and also, the specific example which will be described subsequently.

Before referring to the specific embodiment of the present system, the general structure of a machine instruction requiring the execution of a subroutine will be described. Basically, a subroutine is a particular computer operation not necessarily mathematical which is encountered with considerable frequency when performing mathematical calculations or other operations with the computer. Further, the subroutine is often fairly involved in that it requires a number of machine operations which would be quite laborious for a programmer to write out as a separate series of instructions every time he wishes a particular operation to be performed. Square rooting is a common example of the type of mathematical operation which has achieved the status of a subroutine in most computing systems. Other common subroutines might be sine, cosine, log, anti-log, convert to binary, convert to decimal, input, output, etc.

Depending on the particular computing system being used, the subroutine may be stored in the normal read/write storage or as a part of quasi-machine structure if the system is of the micro-programmed variety. In any event, the stored subroutine contains a specified list of machine instructions which, when taken sequentially, cause a particular operation required to be performed. This may include loop instructions or just a standard set of sequential steps to be performed by the system. The subroutine call, that is, the specification that a subroutine is to be performed and the name or address of that subroutine and its parameters in the machine instruction takes the general form (subroutine, A, $(B+C)$, D) where subroutine is the name of a particular subroutine and A, $(B+C)$ and D are parameters of the subroutine. These parameters in their normal order would normally be the first, second and third parameters called for by the subroutine. Thus, it may be seen that by specifying a subroutine plus listing parameters, it is possible for the machine instruction to branch to the subroutine and perform same. Conventional systems are capable of performing such subroutines when encountered in a machine instruction, however, it is not possible for conventional systems to utilize a subroutine as a particular instruction within a given subroutine. That is, wherein one of the steps within a particularly specified subroutine is in itself an additional subroutine. This is due to the fact that present systems provide little special ability for the performance of subroutines (amounting usually to storing only one return address). It had been assumed by the current state of the art that the hardware necessary to implement a general subroutining system would be so extensive and time consuming as to be unworkable.

Generally, the operation of the present system is divided into two sections. The first is the subroutine call which specifies which subroutine is to be performed, usually by giving the location of the subroutine in memory; and further, lists the parameters. During this first or subroutine call operation, the present system saves such current instruction addresses as are necessary to return to the desired point in the instruction and also, determines where the system is to go when the system starts performing the subroutine and sets controls to detect when the subroutine is completed. This section of the system further evaluates the parameters and provides addresses for the address of said parameters in the memory at a specially developed address location, which parameters may be extracted during the actual execution of the subroutine by the system as will be fully described subsequently.

The second portion of the system actually concerns itself with the performance of the subroutine, the accessing of parameters from memory and finally, returning the system control back to the original instruction sequence when the subroutine is completed. This portion of the system further has controls for extracting a parameter from a higher level subroutine or one which has been stored during the evaluation of a higher level subroutine when said parameter is needed by one of the lower level subroutines.

Perhaps at this point it should be briefly noted that when speaking of a level of the subroutine and the general machine instruction, the level of the standard machine instruction is considered the 0 (or highest) level. The first subroutine encountered will be considered the 1 level and any subsequent subroutines within subroutines would have corresponding lower level indicators. Thus, for example, if the first subroutine contained a second subroutine, which second subroutine in turn contained a third subroutine, this latter subroutine would have the level of 3.

Before proceeding further with the description of the invention, the following general format will be used in describing the manner in which various instructions are denoted in the present description. It should be noted that the symbols used are merely convenient for the purposes of typing and have no other significance. In effect, some such symbol would be used in preparing a machine operation with the significant feature of each is that it would have a particular binary code designation which would be recognizable by the Decoder of the present system.

§=The subsequent two character positions in the Instruction Register, i.e., the subroutine call, are the beginning address in memory of a particular subroutine sequence.

¶=The end of a subroutine in the calling instruction.

,=The subsequent two character positions are an address in memory for a parameter in the calling instruction.

par=A request from the system for a particular parameter during the execution of the subroutine.

Special Address Match=The end of the subroutine during execution of same.

As will be apparent from the subsequent description, the present system is capable of recognizing the above symbols when they appear in the computer Instruction Register and branches its controls accordingly to take care of the particular situation or instruction called for. An example consisting of a subroutine used to illustrate the above language follows. Let a subroutine be defined which is called "iterate" such that the subroutine performs the operation:

$$(1)\qquad \left(1/2\ \text{par 1}-\frac{\text{par 2}}{\text{par 1}}\right)$$

In this mathematical statement, par 1 and par 2 are the two parameters of the subroutine or the numbers upon which the indicated calculations are to be performed. This subroutine would be written in the following way as a subroutine call in the system instruction set:

(2) §IT,NN,QQ¶

In the above expression the (§) indicates that the next two character positions are the address in memory of the beginning of the subroutine. The (IT) represent this specific address. The (,) indicates the next two character positions represent the address in memory of the first parameter. The (NN) represent this actual address in memory of the first parameter. The second (,) again indicates that the next two character positions represent the address of a second parameter and the (QQ) designates this particular address. And finally, the (¶) designates the end of the subroutine in the subroutine call in the primary machine instruction. This above subroutine statement would result in the calculation:

$$(3)\qquad \text{“iterate”}=.5\left(NN-\frac{QQ}{NN}\right)$$

It will, of course, be realized that the address designations would actually need numbers in an operating example as will be described subsequently.

Referring again to Formula 2, the subroutine call, what the system must do upon recognition of the subroutine call signal (§) is set in operation the mechanism for saving the subroutine address whereby it may be performed once the system has determined that the end of the subroutine call statement has been detected (¶), i.e., the subroutine call has been completely evaluated. Thus, upon detection of the § symbol, the next two characters (IT) are temporarily placed in a Holding Register and the parameters NN and QQ are evaluated and stored in the first and second special parameter address storage positions. Upon the detection of the ¶ symbol, the system knows that the subroutine call statement is completely evaluated and at this point, uses the subroutine address to extract the subroutine from memory and place same in the system Instruction Register and then extracts the address of the (¶) in the Instruction Register and places this in the Push Down storage location and places the end address of the subroutine in a special Working Register (SER) so that as the subroutine is performed, a continuous address check may be made against this address to determine when the end of the subroutine is reached. As the subroutine is performed and the first parameter is called for, the system will extract the address NN and use this address to extract the desired piece of data. And likewise, when the second parameter is called for, the address QQ will be extracted and this address in turn will be used to obtain the second segment of data necessary to perform the subroutine. Once the subroutine is performed and the end has been reached, the return address in the instruction is extracted from the special Push Down Store and the main instruction itself is brought back out and placed in the Instruction Register and control is returned to the conventional instruction set until subsequent subroutines are encountered.

The above was a simple case of a single subroutine call. Consider now the situation where a particular subroutine actually contains an additional subroutine, the performance of which is necessary to its performance. Consider, for example, the "square root" subroutine which would be written in the form:

(4) §SR,NN,QQ¶

The above constitutes a subroutine call for a "square root" subroutine in which the (§) indicates that the next characters are the address of this subroutine sequence in memory and the comma and the NN and QQ are the two parameters necessary to perform this subroutine and the (¶) indicates the end of the subroutine call. This subroutine is actually stored in memory and consists of the following steps:

```
        (SR:)    EN:.5*(par 1)→XX
        (loop:)  §IT,XX,par 1¶→XX'
                 If XX−XX'<par 2 go to end
(5)              XX'→XX go to loop
                 XX'
        (EN:)
```

In this subroutine, par 1 indicates the number to be square rooted and par 2 indicates the accuracy to which this "square root" subroutine is to proceed. It is noticed that in the "square root" subroutine there appears the use of another subroutine, the "iterate" subroutine. The important property of the system is that it allows complete freedom in the number of subroutines within subroutines and also the use of parameters. The desired parameter will always be made available to the right subroutine. It is noticed in the above example that par 1 of the "square root" subroutine in actuality becomes par 2 of the "iterate" subroutine.

In the above "square root" subroutine the first step called for is the modification of par 1 by multiplying it by .5. This result is then transferred into a Result Register denoted by the address XX. The second or loop step of the "square root" subroutine is the performance of the "iterate" subroutine wherein par 1 of the "iterate" subroutine is given in the conventional form of an address in memory, i.e., XX. The second parameter of the subroutine is given the symbolic address par 1, which, as is apparent, is the par 1 of the "square root" subroutine. The present system in evaluating this inner subroutine places the address XX at the special storage location for the first parameter of this particular subroutine and in order to obtain the correct address in memory for the par 1 which has been previously stored, par 1 is evaluated as if it had appeared normally in the program for the "square root" subroutine, and place this address in that part of memory designated for the location of the second parameter, i.e., par 2, for the inner subroutine. Thus, it will be apparent that the present system greatly simplifies the manner in which subroutines containing subroutines may be called. Since it allows the inner subroutine to be stated in a completely general way, independent of the level at which it may be used, and does not require the returning to the master program to extract the particular parameters for said subroutine.

The remainder of the instructions of the "square root" subroutine are fairly conventional. The third step is a conventional "If" operation wherein two numbers are compared for a particular situation, which result compares branching of the operation either to its end or back into the "loop" portion of the operation.

Figure 1:
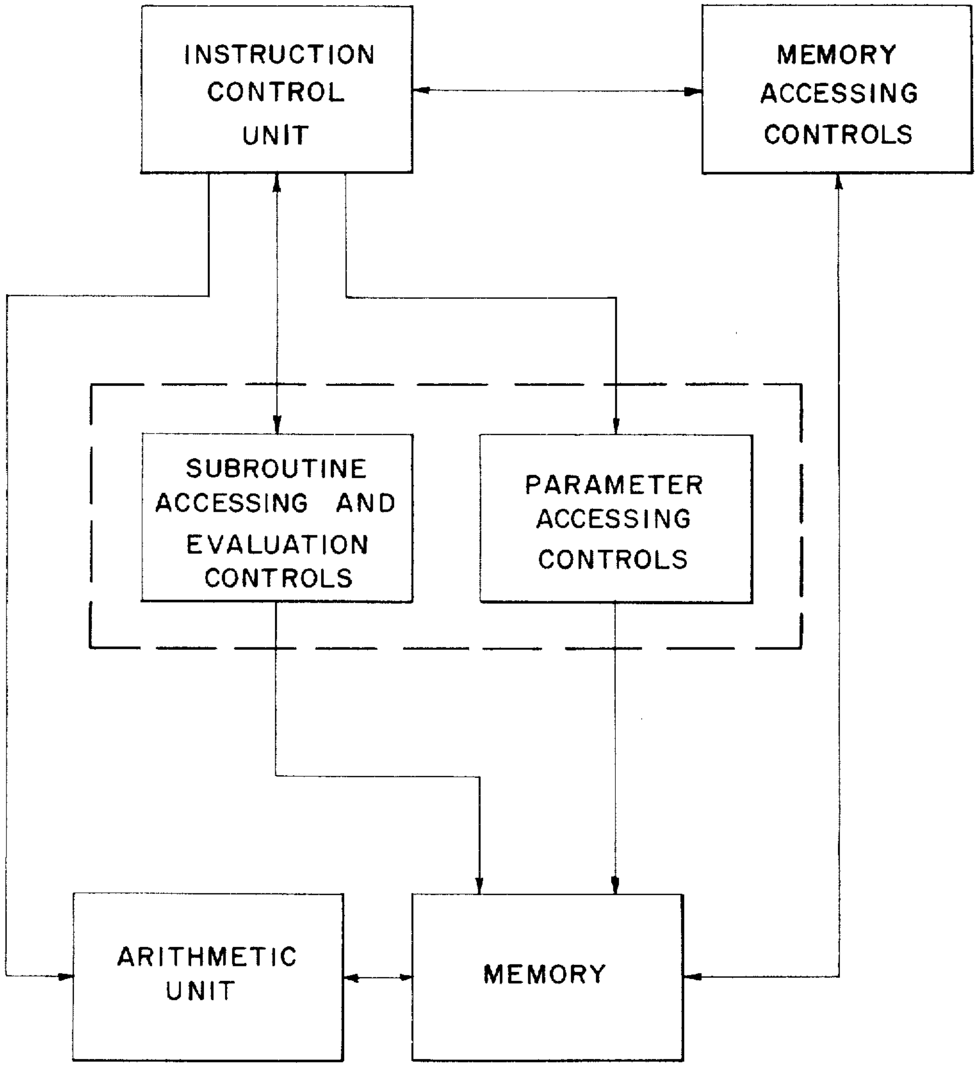
FIGURE 1 is a block diagram showing a general stored program computing system and illustrating in a general way the manner in which the present system is utilized.

The objects and advantages of the system will be more clearly evident from the following description of the invention with respect to the drawings. In FIGURE 1 there is shown a block diagram of a conventional stored program computing system illustrating the interrelation of the system of the present invention to this overall general type of computer. The portion shown within the dotted line indicates that portion of the system included by the present invention. It will be noted that such general purpose computers conventionally consists of an Instruction and Control Unit, which, of course, receives the computer instructions and provides signals to the Memory Accessing Controls to extract both instructions and data from the Memory and further provides instructions to the Arithmetic Unit which performs the various mathematical operations on the data. The Instruction and Control Unit then causes the results of the various mathematical operations to be restored in the Memory at the desired result storage location. A portion of the present system indicated as the "Subroutine Accessing and Evaluation Controls" represent that portion of the present system which is actuated by a subroutine call appearing in the instruction sequence and which causes the overall computer system control to branch into the controls of the present system. As stated generally, this portion of the system evaluates a subroutine insofar as storing and obtaining such addresses as are necessary to extract the subroutine and perform same and also, evaluates the parameters and causes same to be stored in memory at an appropriate storage location.

The second box within the dotted portion of FIGURE 1 is marked Parameter Accessing Controls and this box is effective to control the accessing of the actual parameters from memory while the subroutine itself is being performed. It is also this section which primarily recognizes that a symbolic parameter call in an inner subroutine indicates that the actual parameter address is to be obtained from a higher lever subroutine routine, and effects the system controls to distinguish this instruction from a call to extract the subroutine from memory and recognizes it as an evaluation routine. However, this latter operation will be rendered more understandable from the specific example which will be described subsequently in the specification.

From the above description of FIGURE 1 it may readily be seen that the system of the present invention is readily adaptable for use with any general purpose computer and although the apparatus illustrated is very similar to that of the above referenced copending patent application Ser. No. 292,606 insofar as certain registers and general design concepts are concerned, it is obvious that the system could equally well be used with any general purpose computer having conventional Instruction and Control Units, etc.

Figure 2:
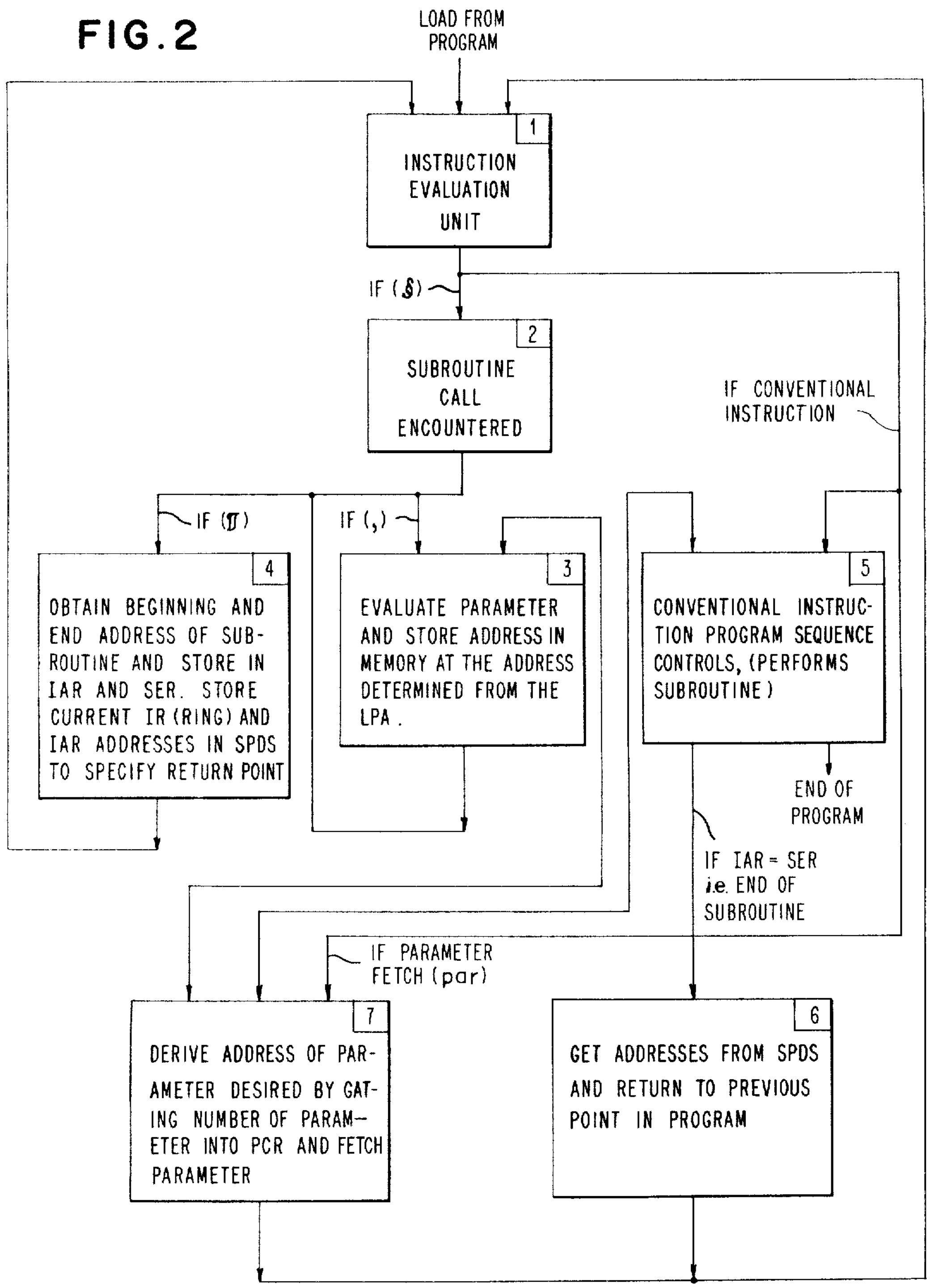
FIGURE 2 is a block flow diagram illustrating the principal operations performed by the present system and the order in which said performance occurs.

Referring now to FIGURE 2, there is shown a general flow diagram which illustrates the sequence of operations performed by the present invention. Each of the boxes of this flow diagram contains a small number in the upper right hand corner thereof which is used simply for ease of reference to the various portions of this flow chart. Referring now to FIGURE 2, it will be noted that the block 1 entitled Instruction Evaluation Unit is the starting point of this system which is loaded from the program. This indicates the Instruction Register and Decoders therefor which evaluate each character of a system instruction and determines whether or not it is a character which will cause the control of the system to be shifted into the present subroutine evaluation mechanism. Block 2 entitled Subroutine Encountered indicates that at this point the subroutine indicator (§) has been found which branches into the present control system. Also, this block indicates that certain preliminary steps are taken, such, for example, as the placing of the subroutine starting address into a temporary holding storage location until the subroutine is completely evaluated and it is desired to actually extract the subroutine from memory and start performance of same. Immediately after encountering the subroutine, the parameters are evaluated in the box marked 3. As indicated in the text within the box, the parameter itself is evaluated and its address is stored in the Main Memory at the address derived from the Level Parameter Address (LPA). As will be explained subsequently, the LPA address is derived from the Level Counter and also the Parameter Counter, which two counters are set according to the particular level of the subroutine being currently evaluated and also the number of the parameter being currently evaluated. Upon completion of the parameter evaluation and the detection of the end of the subroutine (¶) the system branches to block 4. In this block the beginning address of the subroutine is extracted from the temporary storage register and this address is used to extract the actual subroutine from memory. As explained previously, for our particular example the end address of this subroutine is extracted from the memory and placed in the special Subroutine End Address Register wherein it is compared with the current address in the Instruction Address Register as this system proceeds through an evaluation of the subroutine instruction. Also, the current IAR address and current SER address are stored in the SPDS. The bottom of this block indicates branching back to block 1 wherein the subroutine instruction is carried out or evaluated and performed in the normal function in the same way that any other program would be carried out and upon completion of the program as shown in block 5, the machine will either signal "end" which means that the conventional program is completed, or if it is currently in a subroutine, it will cause a signal to go out to block 6 shown below block 5 in the figure. This branching is accomplished by comparing the contents of the Instruction Address Register with the contents of the Subroutine End Address Register. When these two addresses are equal and a sufficient amount of time has been allowed for completing the current instruction in the Instruction Register, system control reverts to the conventional instruction program (this is because this instruction is a multiple character instruction which must be performed a character at a time under control of the associated Ring). If a special mark is used to signify the end of a subroutine, then the detection of this mark rather than an address match will signal said end of the subroutine. Block 6 indicates that upon the completion of the subroutine the system must withdraw the address from the Special Push Down Store which indicates the position in the original system instruction at which the system is looking, at the time the end of the current subroutine was detected and this address is used to reload the Instruction Register with the proper general system instruction and also to set the Ring to the proper character position thereof. Also, the end address of a current lower level subroutine, if there is one, is placed in the Subroutine End Address Register in the event that the subroutine just completed is a lower level subroutine within a subroutine. And concurrently, the Level Counter Register is decremented by 1 so that subsequent requests for parameters will extract parameters from the proper address in memory. Upon completion of block 6, the system again returns to the Instruction Evaluation Unit wherein the system will proceed with the current program in the Instruction Register.

Block 7 performs the operation of extracting a parameter from memory under control of the LPA when a request for a parameter is encountered in a subroutine program. As was stated previously, the performance of the subroutine program is different than from the evaluation of the subroutine call. In the former case it is necessary to first extract the address from the special storage location of the data and then subsequently extract the data so that the particular operations may be performed. In the above description of typical subroutines and in the subsequent example, the symbol par, which as explained normally means a request for a particular parameter during the execution of a subroutine, is shown as three character positions for ease of description, however, it should be understood that such symbol would only take up one character position as a particular binary bit combination in the instruction. The controls in block 7 and block 3 actually cooperate to detect when the symbol par appears in a request for a parameter evaluation during a subroutine evaluation and distinguishes the situation from the case wherein a subroutine is actually being executed and a parameter is being called for. However, this is a control detail and will be more evident from the following example wherein such a situation occurs.

Referring now generally to the logical schematic diagram of FIGURE 3 and also to the subsequent Timing Sequence Chart, while at the same time referring to the flow chart of FIGURE 2, it should be noted that the steps shown generally in block 2 are accomplished by the clock steps SS2 through SS4B.

The steps indicated by block 3 of FIGURE 2 are accomplished by clock steps SS6 through SS12.

The operations accomplished by block 4 are performed generally by clock steps SS14 through SS20.

The steps indicated by block 6 of FIGURE 2 are accomplished in general by clock steps SS22 through SS26. The operations indicated by block 7 of FIGURE 2 are accomplished by the clock steps SS28 through SS38. It will be noted, of course, that the steps performed by block 5 of the flow chart of FIGURE 2 are those steps performed by a conventional computing Instruction Register and control circuit which automatically performs the particular standard instruction sequence.

Referring now to FIGURE 3, which is a composite of the three drawings of FIGURES 3A, 3B and 3C, a detailed logical schematic diagram showing the principal functional units of the present system as well as the primary control section is illustrated. As will be noted, the primary control section appearing in the lower half of the figure consists of a plurality of single shot clock stages which are numbered from SS2 through SS38. Each of these stages is a well known single shot multivibrator which when triggered produces a first or output pulse and at a subsequent time produces a second or turn off pulse. These simple timing blocks are utilized in the control system of the present invention, however, it is to be understood that any one of a number of different timing methods could equally well be used without departing from the spirit and scope of the invention.

A detailed description of the invention will be apparent from the subsequent example wherein an instruction comprising a subroutine containing an additional subroutine will be described. However, the following general description of the functional units will make their purpose clear. The Instruction Register is a conventional Instruction Register which is utilized for inputing the system instruction to the system wherein it is evaluated a character at a time under control of its associated Ring. Instructions may be gated into or out of the Instruction Register a character at a time under control of its associated Ring or a complete instruction word at a time under control of the gate circuit indicated as G18 which loads the Instruction Register from memory when required by the program. The block marked Subroutine Address Register serves the purpose of temporarily storing the address of the beginning of the subroutine in memory once such a subroutine has been detected by the system. This address is subsequently extracted from this register and placed in the Memory Address Register for actually obtaining the subroutine and performing same. The Instruction Address Register is used to obtain the address of instructions from memory.

The Object Address Register is utilized primarily to store the address of data, i.e., parameters, which addresses are subsequently either stored in memory during a parameter evaluation procedure or utilized to extract data from memory under control of the Conventional Instruction Program (CIP). The Level Counter Register and the Parameter Counter Register make up the Level Parameter Address which is utilize for the storage of parameter addresses during the parameter evaluation routines. The Level Counter Register keeps track of the particular subroutine heirarchy in which the system is presently sitting and the Parameter Counter Register keeps track of placing the actual parameter addresses in successive positions during parameter evaluation. It further is used to directly receive a number from the Instruction Register during an actual parameter fetch operation when the subroutine is being performed and this new number is used to actually access the data address from memory and this data address subsequently used to extract the data to perform the operation required.

The Subroutine End Address Register is utilized to store the end address of a particular subroutine which is being performed and this address is used and continually checked against the Instruction Address Register contents so that the system is able to detect when the end of a subroutine is reached which will cause the system to be switched back into the previous instruction which may either be an OR level subroutine or a main computer program. As stated previously, alternative systems detected at the end of a subroutine may be used without materially affecting the design of the present system as set forth herein.

The Subroutine Push Down Store is utilized to save the reentry address point in an instruction sequence prior to entering a subroutine and also the address of the end of any subroutine which may currently be in the process of being executed at the time an additional subroutine was encountered. If the current instruction being encountered were the main computer program, the end address stored in the SPDS would be a 0 which obviously woud indicate that the next higher level is the main program.

The Memory Address Register and the Memory are conventional three dimensional, random access word addressable memories which would obviously include a Memory Address Register, the Memory itself, Memory Data Register, drivers, inhibiting amplifiers, and sense amplifiers as are well known in such memory systems.

The various registers just described are quite conventional in the art and are shown functionally. For example, the bi-directional cables feeding into the bottom of the Register blocks containing single gate circuits for either reading in or reading out will be understood to be quite simplified as obviously the input and output lines to any set of registers would in actuality be different. But in view of the fact that such registers and setting and reading circuitry are well known, it is believed that a comprehension of the present system is greatly enhanced by this simplification.

The Decoder block is a conventional binary Decoder wherein an input binary code as stored in a character of the Instruction Register is decoded and depending upon the particular character detected, one of the lines out of the Decoder will be brought up. The only four significant lines for the present system are the (¶) which indicates the end of a subroutine, the (§) which indicates the beginning of a subroutine, the (par) which indicates a request for a parameter during the execution of a subroutine and a (,) which indicates that a parameter is to follow during a subroutine and parameter evaluation routine. As will be apparent, a signal appearing on these lines initiates the various clock stages shown in FIGURE 3 to which the lines are connected.

The Address Compare Register is a Compare Register which operates under control of the system and which is indicated as branching to clock stage SS22 when it is found that the IAR equals the SER. This indicates that the end of a subroutine currently being executed has been reached. A line is also shown proceeding to the Conventional Instruction Program block which indicates that the execution of any instruction or attempt at further execution in the Instruction Register is inhibited when this particular line becomes active.

The specific details of operation of the present system will be apparent from the following specific example of a subroutine encountered in a main instruction program which is to be executed. It will be noted that this is the same instruction which was previously described in the specification.

The following Timing Sequence Chart indicates the operations which must occur during each clock cycle and also indicates by means of the "If" statement the tests are made to determine in which direction a particular control sequence will go. By referring to this Timing Sequence Chart together with the flow chart of FIGURE 2 and the logical schematic diagram of FIGURE 3, the overall operation of this system may be readily understood.

TIMING SEQUENCE CHART

CL–2 ---- Reset Parameter Counter Register to 1
→CL–4

CL–4 ---- Increment Level Counter Register
→CL–4B

CL–4B -- Advance the Instruction Register and gate the next two characters into the Subroutine Address Register
If the next character is a (,)→CL–6
If the next character is a (¶)→CL–14

CL–6 ---- Gate the next two characters in the Instruction Register to the Object Address Register
Advance Instruction Register
If the next character is a (par)→CL–36
If the next character is not (par)→CL–8

CL–8 ---- Gate contents of the Level Parameter Address to the Memory Address Register
→CL–10

CL–10 --- Gate the two character address stored in the Object Address Register to the Memory
→CL–12

CL–12 --- Increment the Parameter Counter Register
If the next character is another (,) return to CL–6
If the next character is a (¶)→CL–14

CL–14 --- Gate the address of the next character position in the Instruction Register to the Subroutine End Address Register
→CL–16

CL–16 --- Gate the address in the Subroutine End Address Register to the Subroutine Push Down Store
→CL–18

CL–18 --- Gate the address in the Subroutine Address Register to the Instruction Address Register
Access memory at the address in the Instruction Address Register to gate the program into the Instruction Register
→CL–20

CL–20 --- Gate the end address of the subroutine from the Instruction Register to the Subroutine End Address Register
Return the system to control of the conventional instruction program (CIP) until the system detects that the address in the Instruction Address Register equals the address in the Subroutine End Address Register
At this point proceed to CL–22

CL–22 --- Gate the Subroutine Push Down Store to the Subroutine End Address Register
→CL–24

CL–24 --- Decrement Level Counter Register
→CL–26

CL–26 --- Gate the Subroutine Push Down Store to the Index Address Register
→CIP
(At this point the conventional instruction program again takes over and the system will proceed with interpreting the standard instruction until one of the previously enumerated 4 characters is detected by the Decoder.)
If a parameter (par) is encountered out of the Decoder and CL–6 is off →CL–28

CL–28 --- Advance the Instruction Register
→CL–30

CL–30 --- Gate the parameter number indicator from the Instruction Register to the Parameter Counter Register
→CL–32

CL–32 --- Gate the address from the LPA to the MAR
→CL–34

CL–34 --- Gate the contents of the memory at the address in the MAR to the OAR
If clock stage 6 did not initiate this cycle, return to the conventional instruction program (CIP) control
If CL–6 initiated CL–28→CL–38

CL–38 --- Increment Level Counter Register
Gate SPR to PCR
Go back to CL–8

CL–36 --- Decement Level Counter Register
Gate contents of Parameter Count Register (PCR) to Save Parameter Count Register (SPR)
→CL–28

*Example*

The present example will clearly describe the operation of the present system relating to a specific subroutine which it will be assumed was placed in the system Instruction Register and detected. This example is the same as the one previously described and generally sets forth the operation of the system. As stated previously, the subroutine call comprises the detection of the following statement in the instruction sequence:

§SR,NN,QQ¶→RR

As described previously, this is a subroutine call for a "square root" subroutine, the subroutine is stored in memory at an address beginning at SR and comprises the following:

```
(SR:)   EN:.5*par 1→XX
(LP:)   §IT,XX,par 1¶→YY
        If XX–YY<par 2, go to EN
        YY→XX go to LP
        YY
(EN:)
```

In the above subroutine sequence it will be noticed that the second line contains the subroutine "iterate" which is indicated by its call statement. As stated previously, this subroutine is actually stored in memory as follows:

```
(IT:)   TE:.5(par 1–par 2/par 1)
(TE:)
```

It will be noted that upon execution of the subroutine the parameter par 1 of this subroutine is XX and that the second parameter par 2 is par 1 of the higher level or main subroutine or the quantity represented by the address NN.

Let us assume that it is desired to find the "square root" of the number 22 to accuracy .005, these last two numbers are assumed to be stored in memory locations NN and QQ respectively and where it is desired to store the result of this subroutine in storage location RR. The way in which this subroutine call would be written is indicated above. Let us now follow the execution of this instruction. Under normal instruction controls, the above instruction will be in the Instruction Register and will be normally executed until the §SR is rached. This indicates that a subroutine appears in the Instruction Register and sends an appropriate signal to SS2. SS2 progresses through SS4B which indicates schematically that the beginning address of the subroutine SR is stored in the Subroutine Address Register. From whence it will be accessed when it is desired to actually extract the subroutine from memory. The next thing the system will do is evaluate the parameters. The PCR Register is used to indicate the parameter number, and this is reset to 1 by SS2. The LCR Register indicates which level of subroutine is being entered. Since we are about to enter a subroutine, this Register will be incremented by 1. At the start of a program, this Register is always reset to 0. This has now been incremented to 1 by SS4. Next, the Instruction Register is advanced one character so the "," after the §SR is being gated to the Decoder. A signal is sent to both A2 and A4. However, since a signal is on the "," line out of the Decoder, a signal is sent only to SS6. This causes the address of the parameter to be placed in the Object Address Register. In our simple example, this address consists of two characters which can be gated directly from the Instruction Register. In a more general case, this could be an arithmetic expression as well as just a simple operand. In this case, the normal instruction controls would evaluate the expression under its normal rules and deliver the address of the result to the Object Address Register. Next, since the parameter is not itself a parameter of the higher level subroutines, SS8 causes the contents of Register LPA, which is a concatenation of the LCR and PCR Registers, to be gated to the MAR. In this way an address is derived from the current level and parameter counts. In this location will be placed the address of the particular parameter at this level. In this case, NN is placed in location 11. This is done by SS10. Next, the PCR is incremented and control returned to the inputs to A2 and A4. At this time, the Instruction Register is gating the comma after NN to the Decoder so again the path from A4 is followed. This places the address QQ into location 12 and again control is returned to the inputs to A2 and A4. This time the parentheses after QQ is being gated from the Instruction Register to the Decoder and the path from A2 is followed. First, the Instruction Register is advanced so the character beyond the parentheses is being gated by the Ring. The address of this character, an "→," is then gated to the Subroutine Push Down Store, SPDS. This is so that when the subroutine has been evaluated, normal control can be returned to the place it left off. Next, the current contents of the Subroutine End Register, SER, is gated to SPDS. In this case, a 0 is sent to SPDS. If we were already in a subroutine, then the end address of this subroutine is saved so that it can be restored to the IAR when control is returned to where it left off. Finally, the beginning address of the subroutine SR is placed into the Instruction Address Register and the subroutine end address, EN, which is available in our simple case right after the SR address at the subroutine, is placed into the SER. Control is then returned to the normal instruction control which then executes instruction starting at SR.

This will proceed normally until par 1 is reached. This will cause a signal to SS28. Here the address of the data which is parameter 1 is needed. First the IR is advanced to the number 1. SS30 then gates this number into the PCR. Next, SS32 causes the contents of LPA, which is now #11 to be sent to MAR. Finally, SS34 causes the contents of location 11 to be sent to the Object Address Register. The contents of location #11 is NN, which is the address of the first parameter. Thus, in this simple way, the address of the current data has been supplied. Control then returns to the Instruction Control Unit for normal execution.

The next special situation is when the name *IT is reached. This is the name of another subroutine which must be executed in order to evaluate the subroutine SR. As with the previous subroutine, control is sent to SS2 after the address of the subroutine has been placed in an appropriate Holding Register. The PCR is just set to 1 and then the LCR incremented by 1. The LCR now has a value of 2. The parameters of this subroutine will then be evaluated. The address of the next parameter, XX, is placed into special location #21 by the procedures shown by SS6 through SS12 and the PCR incremented to 2. The next parameter is par 1. Thus, a signal will be sent to the parameter evaluation controls. Since a signal is coming from SS6, a signal will appear at the output of A6 causing SS36 to decrement the LCR. The LCR had just been incremented, but, here, it must be decremented temporarily so that the proper parameter address can be found. This address is found in location #11, which is the value of the LPA. Again, because of the special circumstance indicated by a signal coming from SS6, SS38 will cause the LCR to be incremented back to 2. This address in 12 is placed into Object Address Register as indicated. Next, the value of the LPA, 22, is placed into MAR and the contents of the Object Address Register are placed into location #22. In this way the address of the first parameter of subroutine SR has automatically been made available as the second parameter of subroutine IT.

Since a) appears next, the control from A2 will be operated. This places the return address which is a combination of the IAR and the IR Ring and the current subroutine end address, EN, from the SER into SPDS, and places the begin and end addresses of the new subroutine obtained from the memory at the subroutine store location into IAR and SER, respectively. The new subroutine is then executed by the normal control. In this subroutine par 1 and par 2 will be evaluated by obtaining the addresses in location #21 and #22.

The end of this routine is then reached. At this time $IAR=SER$ and the resultant signal is sent from CIP to SS22. The last address put into SPDS, EN, is first restored to SER. Next, the LCR is decremented by 1, since content is about to return to the next higher level of subroutine. Finally, the next address in SPDS, which was the return point of the next higher level subroutine, is placed into the IAR, and then normal control proceeds to execute from that return point, which is the → after §IT,XX,par 1¶

Control will eventually return to LP, at which point subroutine *IT is again reached. The whole procedure is again repeated, including evaluation of parameters. Finally, the end point of the SR subroutine will be reached and control returned to the arrow after

§SR,NN,QQ¶ in the same way control was returned from §IT to §SR.

Thus, with a very simple mechanism, a completely general subroutine system is allowed. The generality of the system is indicated by the fact that a given subroutine may be used in its own definition. Thus, for example, the subroutine §FACT,N¶ may be defined as:

```
(EN:)   If par 1=1, go to F1
        §FACT,(par 1-1)¶*par 1, go to EN
(FI:)   1
(EN:)
```

From the above example, it may be clearly seen how the present system operates to evaluate subroutines and perform subroutines. This example has been kept somewhat simple, however, all of the characteristics of the system are believed to be clearly described hereby, particularly those features which allow the system to proceed from one level of subroutine to the other and to keep track of parameters within inner subroutines which are stated symbolically in the particular call instruction within the higher level subroutine. It will be noted that certain details of timing are shown somewhat generally by certain of the clock stages since it will be obvious that to gate a two character address from the Instruction Register more than a single clock stage would technically be required. For example, two separate stages to advance the Instruction Register Ring would be required as well as two separate stages to actually gate the address from the Instruction Register to, for example, the Object Address Register after the particular Ring shift. However, to show all of these clock stages as separate steps would be obvious and to specifically show them all on the logical schematic drawing would only serve to complicate same and obfuscate the basic concepts of the invention, hence the logical schematic has been kept functional in these certain respects.

As stated previously, the method of determining the end of a subroutine chosen in the presently disclosed embodiment of the invention is only one way of recognizing same. For example, a special symbol may be used in the subroutine program to indicate such occurrence.

It is also to be clearly understood that the various symbols utilized to aid in the description of the present system, i.e., the subroutine beginning and end symbols, the parameter symbols and the parameter evaluation symbols are but merely illustrative and it is to be understood that such symbols actually appear as a multiple bit binary code representation and may even be detectable from particular addresses. For example, the address of a subroutine in memory may contain the information as to its specific location in memory and may also contain an indication recognizable by the Decoder that this address is uniquely a subroutine address. In any event, the changing of the timing controls that take care of this situation would be obvious to a person skilled in the art from the teachings of the present invention.

As stated previously and explained in detail in the preceding example, the present invention is capable of handling subroutines within subroutines when said inner or lower level subroutine is encountered as a particular step of a higher level subroutine. It should be also noted that the inner subroutine could also appear as a parameter in a subroutine call statement such as the following:

§ZQ,NN,QQ,§XR,par 1, par 2¶¶ wherein the inner subroutine, §XR,par 1, par 2¶ is stated to be a parameter used directly in the execution of the ZQ subroutine with but little modification of the system disclosed, which modification would be obvious to a system designer.

Also, as stated previously, the particular timing means, i.e., the series of inter-connected single shot multivibrators is but exemplary of any of a large number of timing means conventionally used to control the operation of computing systems. For example, a completely synchronous system could be used rather than the essentially asynchronous system disclosed.

In summary, the present invention provides hardware for greatly simplifying the execution of subroutines in computer programs and further allows the use of a subroutine within a subroutine in a very general way and also, the symbolic description of parameters used within the inner or higher level subroutines referring to those parameters defined in the original subroutine call statement.

Thus, the system of the present invention represents a contribution in the area of computer control devices wherein programming of a complex subroutine is considerably simplified and also, time and performance of said subroutine on the machine is reduced due to the far more direct method in which the subroutine may be defined and performed.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a general purpose electronic computer including: an Instruction Control Unit having an Instruction Register means therein for receiving the master system program and for executing conventional instructions contained therein, memory accessing controls, a Memory, and an Arithmetic Unit for performing matematical operations, the improvement which comprises:

means for recognizing a closed subroutine call in an instruction program, means for evaluating said call and storing the parameter addresses therefor in a predetermined storage location, means effective before the actual accessing of a detected closed subroutine to store a return address determined from the end of each closed subroutine call statement detected in a lower level instruction program upon detection of same, means for extracting this address upon the completion of said closed subroutine execution for returning to said lower level instruction program, a Push Down Store for storing said return address wherein the last information stored therein is the first information out, means for extracting said closed subroutine from memory and placing same in said Instruction Register means, means for executing said closed subroutine, means responsive to requests for parameters during said closed subroutine execution for extracting same from said predetermined storage locations, means to return the instruction to the Instruction Register which was stored therein when the current closed subroutine was encountered upon detection of the end of said closed subroutine, and means to return control of the system to said original program at the end of said closed subroutine call.

2. A computing system as set forth in claim 1 above including:

means for generating such prodetermined memory addresses for each parameter address indicative of the level of the particular closed subroutine whose call is currently being evaluated, said addresses also being characteristic of the successive number of said parameter as stated in said closed subroutine call.

3. A computing system as set forth in claim 2 wherein said address generating means includes:

a first counter, means for incrementing said first counter each time an additional closed subroutine level is entered in a given hierarchy of closed subroutines, and means for decrementing said first counter each time a closed subroutine in such hierarchy is completed.

4. A computer system as set forth in claim 3 wherein said address generating means further includes:

a second counter, means for incrementing said second counter each time a new parameter is encountered during the evaluation of a closed subroutine call statement, and means for gating the specific parameter number to said second counter when it is desired to fetch a parameter during the execution of the closed subroutine.

5. A computing system as set forth in claim 4 above wherein said means for automatically evaluating symbolically represented parameters in higher level closed subroutines referring to parameters specified in a lower level closed subroutine call statement includes:

means for recognizing a special symbol indicative of the fact that the particular symbolically represented parameter to be evaluated is a previously evaluated parameter from a higher level closed subroutine, means responsive to this detection to access the memory at the special storage location developed during the evaluation of said parameter in said higher level closed subroutine, and means for developing an address in said special storage location characteristic of the closed subroutine currently being evaluated and for storing said parameter address therein.

6. A computing system as set forth in claim 5 including: means for decrementing said first counter when a parameter is symbolically represented in a lower level closed subroutine call statement and it is necessary to obtain the parameter address from the special storage location assigned during the evaluation of a higher level closed subroutine.

7. A computer system as set forth in claim 6 including: means for retaining the current setting of said second counter at the time the symbolically represented parameter is encountered, and means for resetting said second counter to its original setting after the address of said parameter is addressed from said special storage location.

8. A computing system as set forth in claim 7 including: means for detecting the "end" of a closed subroutine which comprises means for extracting the address of said "end" stored with said closed subroutine in memory and for saving same in a closed subroutine "end" storage location and for comparing said address with current addresses in the system Instruction Register whereby a match indicates that the end of the closed subroutine has been reached.

9. A computer system as set forth in claim 8 including: means for storing the current contents of the closed subroutine "end" address storage location in the Push Down Store, together with the return address wherein the absence of an address in the closed subroutine and address storage location denotes that the return address is in the main program.

10. A computer system as set forth in claim 1 including: control means for said system including a series of interconnected single shot multivibrators having a distinct turn on pulse and a turn off pulse occurring a predetermined time thereafter, and logic circuit means connected in the output line from said single shots operative upon the occurrence of predetermined conditions to control branching of said system.

11. A closed subroutine control and execution system for use with a conventional general purpose electronic computer having an Instruction Register and means for sequentially evaluating the contents thereof, said system comprising:

means for recognizing a closed subroutine call statement in an instruction program, means for evaluating said closed subroutine call statement and storing the parameter addresses therefor in predetermined storage locations, said predetermined storage locations being derived from a first counter means having means for incrementing same each time an additional closed subroutine level is entered in a given hierarchy of closed subroutines and means for decrementing same each time a closed subroutine in such hierarchy is completed, a second counter, means for incrementing same each time a new paameter is encountered during the evaluation of a closed subroutine call statement, means for gating a specific parameter number to said second counter during the sequential fetching of parameters during the execution of the closed subroutine when it is desired to evaluate a parameter call which symbolically relates to a previous lower level closed subroutine call statement, means for developing an address which is a concatenation of the current setting of said two counters at any time that it is desired to store a parameter address during the evaluation of a closed subroutine call, means for storing the return address to said instruction in which a closed subroutine is encountered in a Push Down Store, means for extracting said closed subroutine from memory and placing same in said Instruction Register means and for initiating execution of said closed subroutine, means responsive to requests for parameters during the execution of said closed subroutine for extracting same from said predetermined storage locations under control of addresses provided by said two counters wherein the sequential number of a particular parameter desired during a closed subroutine execution is supplied to said second counter and said parameter address is obtained from said special storage location and the parameter itself subsequently extracted from memory, means to extract the return address from said Push Down Store upon the completion of a closed subroutine statement, and means for utilizing said return address to extract the instruction statement from memory which was currently in the Instruction Register at the time the just completed closed subroutine was encountered.

12. A closed subroutine control and execution system as set forth in claim 11 including:

means responsive to the detection of a symbolic representation of a parameter in a lower level closed subroutine call statement relating to a previously stated parameter in a higher level closed subroutine to access the parameter address from the special memory location in which said closed subroutine was stored when evaluating said higher level closed subroutine and means to restore this parameter address in said special memory address at a location relatable to the closed subroutine currently being evaluated.

References Cited

UNITED STATES PATENTS 3,293,616 12/1966 Mullery et al. ------ 340—172.5

OTHER REFERENCES

Ledley: Programming and Utilizing Computers, McGraw-Hill, 1962, pages 79–85 and 164–168.

Ledley: Programming and Utilizing Computers, McGraw-Hill, 1962, page 87.

ROBERT C. BAILEY, *Primary Examiner.*

R. M. RICKERT, *Assistant Examiner.*